UNITED STATES PATENT OFFICE.

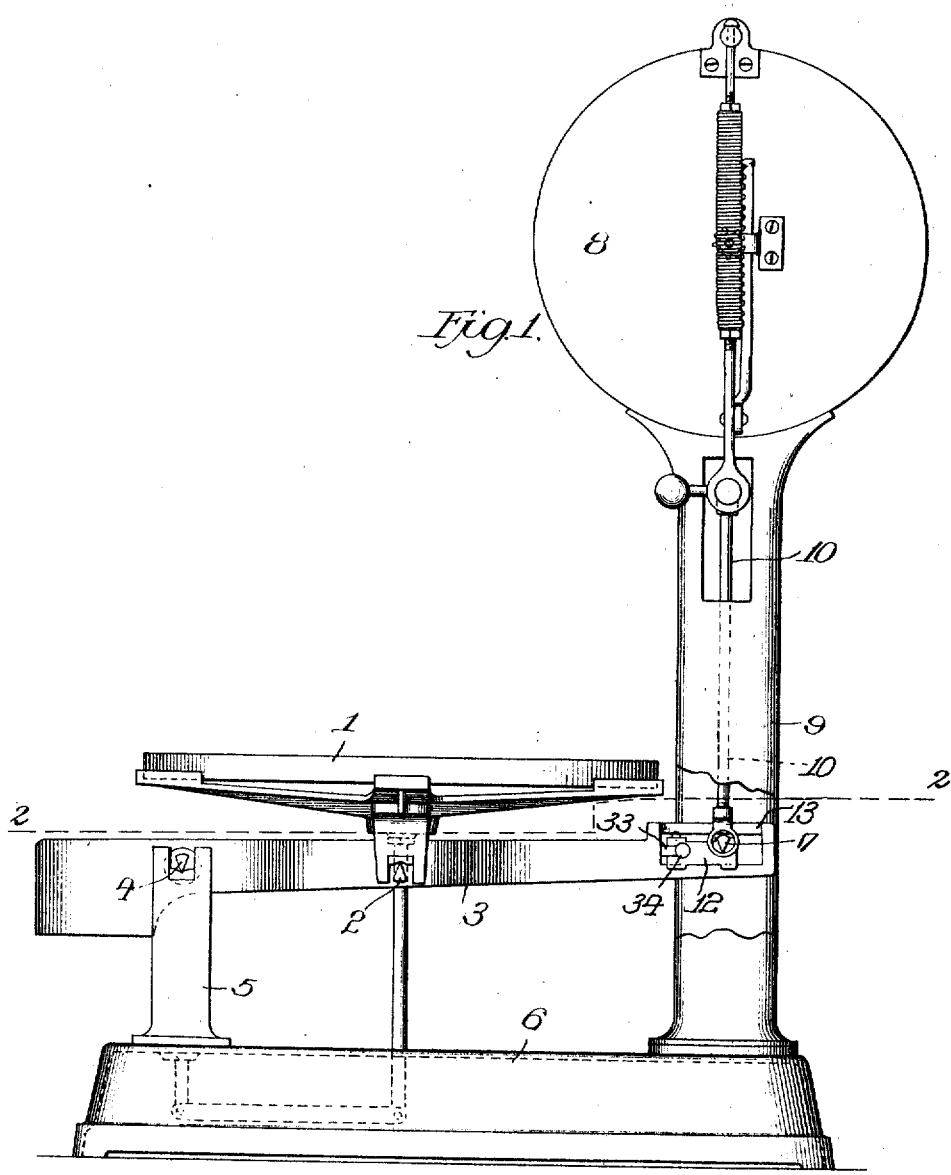

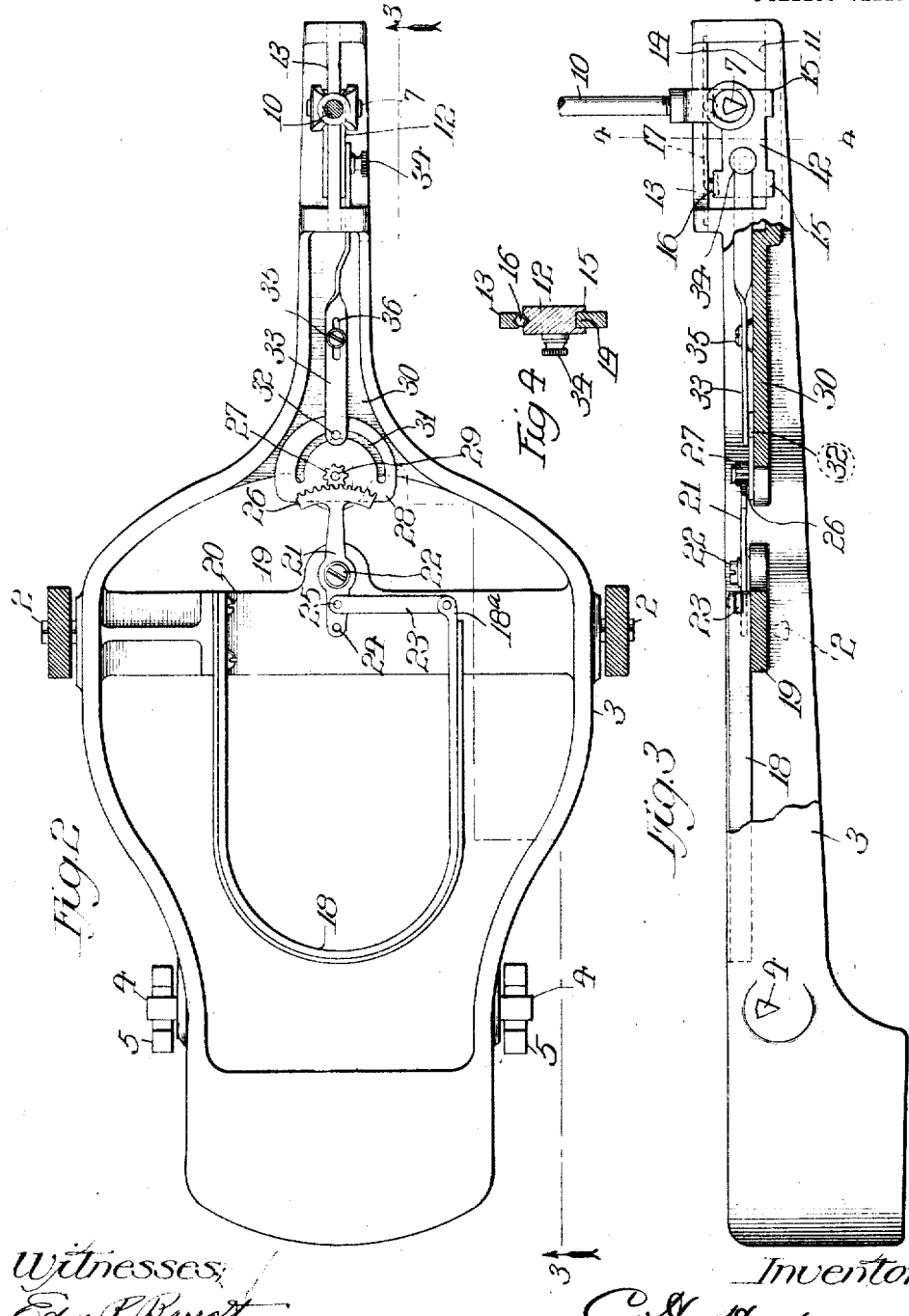

CLARENCE H. HAPGOOD, OF DAYTON, OHIO, ASSIGNOR TO TOLEDO COMPUTING SCALE COMPANY, OF NEWARK, NEW JERSEY, A CORPORATION OF NEW JERSEY.

SCALE.

No. 903,083.

Specification of Letters Patent.

Patented Nov. 3, 1908.

Application filed January 14, 1905. Serial No. 241,130.

To all whom it may concern:

Be it known that I, CLARENCE H. HAPGOOD, a citizen of the United States, residing at Dayton, in the county of Montgomery and State of Ohio, have invented certain new and useful Improvements in Scales, of which the following is a specification.

My invention relates to scales, and more particularly to means for neutralizing or compensating for variations in temperature, to the end that the scale may indicate, with absolute accuracy under all conditions of temperature, the weight or price, or both, of an article, according to the particular character of scale in which my invention may be embodied.

Speaking in general terms my invention comprises a thermostat associated with novel mechanism arranged to affect or vary the relative distance between the pivots of the counterbalancing mechanism and the scale beam, or between the pivots of such beam and the platform or other support for the article to be weighed, to which end I make one of the pivots movable and connect it operatively with a thermostatic device with the result that the contraction and expansion and also the varying tension of the counterbalancing springs due to differences in temperature are compensated for and the well known errors in spring scales due to changes in temperature are avoided.

The object of my invention is to provide novel and efficient mechanism for overcoming the effect of the differences in temperature and compensating therefor, and particularly to provide a construction in which the movable or adjustable pivot, whichever it may be, shall be at all times under the control of the thermostat and be incapable of movement except through the medium of the thermostat. In other words, the movements of the thermostat are freely transmitted to the movable pivot, but no strain or movement can be transmitted from the pivot to the thermostat, with the result that the pivot of itself is locked and can be moved solely by the thermostat. In the present instance these results are brought about by the interposition between the pivot and the thermostat of mechanism capable of actuation only by the thermostat and under the control of it alone and serving to lock the pivot against any movement or strain applied to the pivot direct and not through the medium of the thermostat.

In the drawings, Figure 1 is an elevation of a scale embodying my invention; Fig. 2 a sectional plan view on the line 2—2 of Fig. 1; Fig. 3 a sectional elevation on the irregular line 3—3 of Fig. 2; and Fig. 4 a section on the line 4—4 of Fig. 3.

In the drawings I have illustrated one embodiment of my invention in which I have, for the sake of a clear and definite description but without intention of limitation thereto, chosen to show a scale employing a platform and indicating mechanism of the drum or barrel type and counterbalancing mechanism of the spring type, which constructions are well known and need no detailed description.

Describing, so far as will be necessary, the particular form of scale illustrated in the drawings, the support or the article to be weighed is, in this instance, the platform 1, which is pivoted on the pivots 2 projecting laterally from opposite sides and intermediate the length of the scale beam 3.

The scale beam is itself provided in the present instance with the pair of pivots 4 near one end and bearing in the upper ends of the standards or supports 5, rising from the base 6 of the scale.

The right hand end (Fig. 1) of the scale beam carries a pivot 7, to which the counterbalancing mechanism, comprising more particularly the usual spiral springs, is connected. As shown, this counterbalancing, and the indicating mechanism are arranged within the casing 8 supported on the hollow post 9, and the counterbalancing springs are connected with the scale beam, or rather with its pivot 7, by means of the vertical operating rod 10. In the present embodiment of my invention the pivot 7 is the movable or adjustable one, responding to the effect of the thermostat hereinafter described, whereby the differences in temperature are compensated for; whereas the pivots 2 and 4 have a fixed relation or position, it being understood that a shifting of the movable pivot and the change in their particular relative positions result in changes in degree of the effect upon the counterbalancing or indicating mechanism and thereby obtain accuracy in weighing or computation or both.

As herein shown the inner end of the scale beam adjacent the post or support 9 has a longitudinal slot 11, whose longitudinal parallel sides constitute guides or slides for the movable block 12 carrying the pivot 7. The upper guide 13 is formed as a cross piece, as seen particularly in Fig. 2, while the lower guide is substantially a longitudinal rib projecting upwardly from the body of the scale beam. The guide block has on its under edge or side a guide way formed by the depending flanges 15 embracing the guide 14, while in sockets at the two upper corners of the block are arranged balls 16, received by a longitudinal groove 17 in the lower edge or side of the upper guide 13, whereby a ball bearing is provided.

The position of the block 12 is controlled by a thermostat in such manner that the block is moved longitudinally of the scale beam certain distances by the thermostat according to the temperature, with the result that accurate indication is maintained by the scale regardless of changes in the temperature. As shown, the thermostat 18 is U-shaped, with one leg or end thereof secured or anchored in fixed position to the cross-piece 19 of the scale beam by means of screws 20 or otherwise. The thermostat may be of any suitable construction, being composed as usual of strips of material possessing different coefficients of expansion, with the result that the free end 18ᵃ thereof will have a movement toward and away from the anchored end according to the changes in temperature.

According to my invention the thermostat is not directly attached to or connected with the movable block and its pivot, but indirectly connected therewith by means of novel mechanism hereinafter described which serves the purpose of transmitting to the movable block all the movements of the thermostat due to changes in temperature, but at the same time locks the block against all strain or positive force applied directly to such block. Consequently all the movements of the block are absolutely under the control of the thermostat and the strains or force referred to cannot be transmitted to the thermostat in any manner whatsoever.

The mechanism above referred to as interposed between the thermostat and the movable block consists in the present instance of the following parts: A lever 21 is pivoted by means of a stud 22 on the cross bar 19 and operatively connected with the free end 18ᵃ of the thermostat by a link 23. For adjusting purposes, the end or arm of this lever 21 back of the pivotal point may have an additional hole or holes, such as the hole 24, to receive the pivot pin 25 at the inner end of the link 23. The other arm of this lever carries a curved rack or segmental gear 26, which is arranged to mesh with a pinion 27 adapted to partially rotate or rock a substantially semi-circular cam disk or plate 28. This pinion is secured to a shaft or spindle 29 journaled in the web 30 of the scale beam and the disk is secured to the spindle or to the pinion, as may be desired, so that in either event the disk shall move with the pinion; in other words, the lever 21 is operatively connected with the cam disk by means of a rack and pinion connection. The disk is provided with a substantially semi-circular cam slot 31, which is eccentric to the axis of rotation or movement thereof and is adapted to receive a pin 32 carried at one end of a link or operating bar 33 extending longitudinally of the forward end of the scale beam, as clearly illustrated in Figs. 2 and 3. This bar, which is connected at its outer end with the movable block by means of the screw 34, is maintained in proper position laterally with relation to the scale beam and thereby guided in its longitudinal movements by a stud or pin 35 rising from the web 30 at the scale beam and coöperating with a longitudinal slot 36 in the bar.

From the foregoing description it will be understood that all movements of the free end of the thermostat are communicated to the lever 21 through the link 23 and from such lever to the movable block through the medium of the cam disk and the longitudinal link or bar 33. As the lever 21 is rocked in one direction or the other, the cam disk is likewise rocked, with the result that the link 33 is moved to the right or left (Fig. 2) according to the particular direction of movement or oscillation of the disk, as determined by the direction of movement of the free end of the thermostat. This longitudinal movement of the link 33 is of course communicated to the movable block 12 and the pivot 7 thereby drawn closer to or moved further away from the other pivots 2 and 4, with the result that the scale will indicate accurately notwithstanding the contraction and expansion of the springs and the varying tension thereof due to changes in temperature, which are thus compensated for by the action of the thermostat in changing or adjusting the relative distance between the pivots. Moreover, while the block 12 is free to be moved through the medium of the mechanism interposed between it and the thermostat, it is locked against all movement through positive force or strain applied to it directly, inasmuch as such interposed mechanism is so constructed that force cannot be transmitted from the block to the thermostat, with the result that the thermostat is absolutely isolated and relieved from all strain that may come upon the movable block.

I claim:—

1. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat, said mechanism having means for locking said pivot in its adjusted position.

2. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat with provisions for preventing movement of the thermostat by the pivot.

3. In a scale, the combination of a support for the article to be weighed, counterbalancing mechanism, a pivoted scale beam operatively connected with the support and provided with a movable pivot operatively connected with the counterbalancing mechanism, a thermostat mounted on the scale beam, and an operating connection between the thermostat and the movable pivot to adjust the latter to compensate for changes in temperature and controlled as to length by the thermostat.

4. In a scale, the combination of a support for the article to be weighed, counterbalancing mechanism, a pivoted scale beam operatively connected with the support and provided with a movable pivot operatively connected with the counterbalancing mechanism, a thermostat mounted on the scale beam, and an operating connection between the thermostat and movable pivot for transmitting the movements of the former to the latter including locking means to prevent movement of the thermostat by the pivot.

5. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam device mounted on the scale beam with connections respectively with the thermostat and pivot.

6. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a disk mounted to rock on the scale beam and provided with a cam slot, a connection between the thermostat and disk for rocking the latter according to variations in temperature, and a connection coöperating with the cam slot and movable pivot for operating the latter.

7. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam device mounted to rock on the scale beam, a lever pivoted on the beam and operatively connected at one end with the thermostat and at the other with the cam device, and a connection between such cam device and the movable pivot.

8. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam device mounted to rock on the scale beam, a lever pivoted on the beam and operatively connected with the cam device, a link connection between the thermostat and the lever, and an operating connection between the cam device and the movable pivot.

9. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam device mounted to rock on the scale beam, a pinion connected with such cam device, a lever pivoted on the beam and at one end operatively connected with the thermostat and at its other end carrying a segmental gear engaging the pinion, and an operating connection between the cam device and movable pivot.

10. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam disk mounted to rock on the scale beam and provided with a slot eccentric to its axis of movement, an operating connection between the cam disk and the thermostat, and a link or bar connected at one end with the movable pivot and carrying at its other end a pin engaging the slot of the cam disk.

11. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam disk mounted to rock on the scale beam and provided with a curved slot eccentric to its axis of movement, an operating connection between the cam disk and the thermostat, a link or bar slotted intermediate its length and connected at one end with the movable pivot and carrying at its other end a pin engaging said cam slot, and a pin or stud mounted on the scale beam and engaging the slot of the link.

12. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam disk mounted to rock on the scale beam and provided with a slot eccentric to its axis of movement, a rack and pinion connection between the thermostat and disk, and a link or bar at one end connected with the movable pivot and at the other end carrying a pin engaging said slot.

13. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam disk mounted to rock on the scale beam and provided with a slot eccentric to its axis of movement, a lever pivoted on the beam and at one end connected with the thermostat and at the other end carrying a segmental gear, a pinion connected with the disk and engaged by the gear, and a link or bar at one end connected with the movable pivot and at the other end carrying a pin engaging said slot.

14. In a scale, the combination of a support for the article to be weighed, counterbalancing mechanism, a pivoted scale beam operatively connected with the support and counterbalancing mechanism, a movable pivot for varying the effective leverage of the scale beam, a thermostat, and mechanism arranged intermediate the thermostat and the movable pivot and transmitting to such pivot the movements or variations of the thermostat and comprising a cam device mounted to rock on the beam, operative connections between the cam device and the thermostat and also the movable pivot, and a cross bar on the scale beam to which one end of the thermostat is secured.

15. In a scale, the combination of a support for the article to be weighed, counterbalancing mechanism, a pivoted scale beam operatively connected with the support and counterbalancing mechanism, a movable pivot for varying the effective leverage of the scale beam, a thermostat which is U-shaped with one end connected with the scale beam, a cam device mounted on the beam and operating connections between the cam device and the free end of the thermostat and the movable pivot.

16. In a scale, the combination of a support for the article to be weighed, counterbalancing mechanism, a pivoted scale beam operatively connected with the support and counterbalancing mechanism, a movable pivot for varying the effective leverage of the scale beam, a thermostat which is U-shaped, said beam having a cross bar to which one end of the thermostat is connected, a lever pivoted on the cross bar and operatively connected with the free or movable end of the thermostat, a cam device mounted to rock on the beam and having operative connection with the lever, and a link or bar connecting the cam device and movable pivot.

17. In a scale, the combination of counterbalancing mechanism, a pivoted scale beam having at one end a longitudinal slot formed between parallel guides, the upper guide having a longitudinal groove on its inner edge or side, a block having on its lower edge a guideway to receive the lower guide of the beam, and having sockets on its upper edge, balls arranged in said sockets and engaging said groove, said block carrying a pivot operatively connected with the counterbalancing mechanism, a thermostat mounted on the scale beam, and an operating connection between the block and thermostat.

CLARENCE H. HAPGOOD.

Witnesses:
ALLEN DE VILLBISS, Jr.,
L. B. MCILHENNY.